United States Patent [19]

Niebauer et al.

[11] Patent Number: 5,351,122
[45] Date of Patent: Sep. 27, 1994

[54] ABSOLUTE GRAVITY INLINE MEASURING APPARATUS INCORPORATING IMPROVED OPERATING FEATURES

[75] Inventors: Timothy M. Niebauer; William J. Hollander; James E. Faller, all of Boulder, Colo.

[73] Assignee: Micro-g Solutions, Inc., Arvada, Colo.

[21] Appl. No.: 887,466

[22] Filed: May 22, 1992

[51] Int. Cl.$^5$ .......................... G01P 3/38; G01B 9/02
[52] U.S. Cl. ..................... 356/345; 356/28.5
[58] Field of Search ............... 356/358, 361, 363, 345, 356/28.5

[56] References Cited

U.S. PATENT DOCUMENTS

| | | | |
|---|---|---|---|
| 3,688,584 | 9/1972 | Stone et al. | 73/382 R |
| 3,704,626 | 12/1972 | Stone | 356/28.5 X |
| 3,744,909 | 7/1973 | Bruce | |
| 5,144,150 | 9/1992 | Yoshizumi et al. | 250/561 |
| 5,203,199 | 4/1993 | Henderson et al. | 73/1 |

OTHER PUBLICATIONS

Marson et al, "g-The Acceleration of Gravity; its Measurement and its Importance", J. Phys. E: Sci. Instrum. 19(1986) pp. 22–32.

Faller et al, "Ballistic Methods of Measuring g-The Direct Free Fall and Symmetrical Rise-and-Fall Methods Compared", Metrologia, 25(1988) 49–55.

Nelson, "An Active Vibration Isolation System for Inertial Reference and Precision Measurement", Rev. Sci. Instrum, 62(9) Sep. 1991, pp. 2069–2075.

Primary Examiner—Robert J. Warden
Assistant Examiner—E. Leigh Dawson
Attorney, Agent, or Firm—John R. Flanagan

[57] ABSTRACT

An absolute gravity inline measuring apparatus includes an interferometer arrangement, a test mass tracking system, and a superspring mechanism. The interferometer arrangement includes first and second beam splitters for respective splitting and recombining a laser light beam and upper and lower cornercube retroreflectors facing toward one another and spaced above and below the first beam splitter so as to reflect one split portion of the laser beam in vertically-aligned upper gravity measuring and lower motion compensating portions of a variable leg of the interferometer light beam path. The test mass tracking system includes a cart vertically movably in an evacuated elongated housing and releasably supporting a test mass in a drag-free enclosure. The test mass incorporates the upper retroreflector of the variable leg of the interferometer light beam path. A cart controller is used for selecting operation of the cart in either one of a test mass drop mode or a test mass throw mode for making absolute gravity measurements. The superspring mechanism includes an inertial mass which incorporates the lower retroreflector of the variable leg of the interferometer light beam path, coarse and fine motion compensating mechanisms incorporating main and auxiliary springs operable to maintain the inertial mass in a motionless state, and a temperature-responsive lever mechanism to compensate for temperature-induced changes in the length of the main spring.

22 Claims, 9 Drawing Sheets

ABSOLUTE GRAVITY INLINE MEASURING APPARATUS INCORPORATING IMPROVED OPERATING FEATURES

BACKGROUND OF THE INVENTION

1. Field of the Invention

The present invention generally relates to the measurement of absolute gravity and, more particularly, is concerned with an absolute gravity inline measuring apparatus incorporating improved operating features for attaining higher precision and accuracy.

2. Description of the Prior Art

Measurement of the acceleration of gravity has long been a matter of scientific interest. Measurements of gravity have been a valuable tool for metrologists, geophysicists, geologists and geodesists. A primary requirement for reliable gravity measurement is the longterm stability of the gravity measuring apparatus. An absolute gravity measuring apparatus developed at the Joint Institute for Laboratory Astrophysics (JILA) in Boulder, Colo., USA, employing free-fall and laser interferometric techniques holds the greatest promise for meeting this primary requirement. The JILA absolute gravity measuring apparatus is described and illustrated in an article entitled "g - the acceleration of gravity; its measurement and its importance" by Iginio Marson and James E. Faller, appearing in *J. Phys. E: Sci. Instrum.* 19 (1986), pages 2214 32. The JILA absolute gravity measuring apparatus is also mentioned in an article entitled "Ballistic Methods of Measuring g - the Direct Free-Fall and Symmetrical Rise-and-Fall Methods Compared" by James E. Faller and Iginio Marson, appearing in *Metrolonia* 25 (1988), pages 49–55. For purposes of brevity and clarity, the JILA absolute gravity measuring apparatus hereinafter will be identified as the JILAmeasuring apparatus.

The JILA measuring apparatus is transportable and basically includes an interferometer arrangement, test mass tracking chamber (also known as a dropping chamber), and a superspring mechanism. The interferometer arrangement contains a laser for generating a laser beam and optic elements for splitting, directing, and recombining the laser beam in the manner of a Michelson interferometer. The laser and optic elements of the interferometer are arranged to provide a light beam path having a pair of substantially parallel, horizontally-spaced, vertically-extending fixed and variable legs. The variable leg of the interferometer is terminated by a corner cube retroreflector which, as part of a test mass, is dropped and allowed to be freely accelerated by the Earth's gravity so as to vary the length of the light beam path in the variable leg. The times of occurrence of interferometer fringes produced by light beams recombined from the fixed and variable legs are measured and used to calculate the acceleration of the falling mass. The stabilized laser, used as the light beam source in the interferometer, provides the length standard while an atomic frequency standard provides the time standard.

The test mass tracking chamber of the JILA measuring apparatus is an elongated housing which includes a servo-controlled elevator-type cart which releasably supports the test mass therein and is vertically movable within the housing, a drag-free enclosure integral to the cart surrounding the test mass, and a drive mechanism for causing the cart to move vertically within the housing. In a test mass drop mode, the cart is caused to accelerate away from and thus "drop" the test mass and thereafter to track the free falling test mass, without touching it, while measurement of the falling test mass are being taken. The test mass initially rests on kinematic mounts in the elevator-type cart. The cart can be driven upwardly and downwardly along vertical guide rails within the evacuated housing by a thin stainless steel belt connected to a DC motor of the drive mechanism. After being dropped, the position of the falling test mass relative to the cart is monitored by focussing light from a light-emitting diode carried on the cart, through a lens attached to the falling test mass, onto a position-sensitive photodetector also carried on the cart. An error signal thus derived is used to control the drive motor to accelerate the cart downwardly along a drop path so as to drop the test mass and then leave the test mass falling freely inside the descending cart. As it approaches the bottom of the drop path, the descending cart is controlled to slow down and then gently arrest the fall of the dropped test mass. The cart, with the test mass supported thereon, can then be driven upwardly to return the test mass to the top of the drop path for initiating the next drop and measurement. This rapid turnaround capability is primarily responsible for the ability of the system to acquire data at a very high rate, such as one measurement every two seconds.

The superspring mechanism of the JILA measuring apparatus includes a plurality of auxiliary springs supporting a platform from a base portion of the apparatus, a superspring inertial mass connected with a transparent sphere, and a main spring suspending the inertial mass from the platform. The inertial mass also has a corner-cube retroreflector which terminates the fixed leg of the interferometer retroreflector. The superspring mechanism functions to maintain the test mass and the retroreflector thereof motionless in the fixed leg of the interferometer as the test mass is dropped and allowed to be freely accelerated by the Earth's gravity. The superspring mechanism also includes a photocell and a light source mounted on the platform on opposite sides of the transparent sphere. Light is transmitted from the light source through the sphere to the photodetector. An electro-mechanical servo system is connected to the photocell and, in response to the transmitted light, is operable to drive the platform in order to set the effective lengths of the auxiliary springs in response to any motion of the inertial mass, retroreflector, and transparent sphere in order to cancel these motions and maintain the inertial mass in a motionless state and thereby maintain the fixed leg of the interferometer at a fixed beam length.

The three primary features of the above-described JILA measuring apparatus which account for its ability to achieve high precision and accuracy without sacrificing small size and hence transportability are the test mass tracking chamber, the interferometer, the superspring mechanism. The laser of the interferometer provides high accuracy, the tracking chamber eliminates several sources of systematic errors while providing a rapid means of repeatedly releasing the test mass. The long-period isolation provided by the superspring mechanism greatly decreases sensitivity of the JILA measuring apparatus to ground vibrations. This avoids large drop-to-drop scatter as well as possible systematic recoil effects that might otherwise arise from the finite size of the apparatus.

The fundamental problem involved in absolute gravity measurements is the recognition and elimination of sources of systematic errors in order to obtain accurate measurements as opposed to obtaining consistent but inaccurate measurements. Although the JILA measuring apparatus eliminates most sources of systematic errors, others are known to still exist which degrade the precision and accuracy of the apparatus. Consequently, a need still remains for improvements in the design of the JILA absolute gravity measuring apparatus to attain enhanced performance.

SUMMARY OF THE INVENTION

The present invention provides an improved absolute gravity inline measuring apparatus designed to satisfy the aforementioned need. For purposes of brevity and clarity, the absolute gravity inline measuring apparatus of the present invention will hereinafter be identified as an "inline measuring apparatus" due to the inline vertical alignment of the free-falling test mass and the motionless inertial mass now present in the variable leg of the interferometer of the apparatus.

In accordance with the present invention, the inline measuring apparatus incorporates several operational features which are improved so as to reduce or eliminate sources of systematic errors identified in the prior art JILA measuring apparatus and thereby provide enhanced high precision and accurate measurement results. These improved operational features are incorporated in an interferometer arrangement, a test mass tracking system, and a superspring mechanism of the inline measuring apparatus.

The interferometer arrangement of the inline measuring apparatus employs a means preferably in the form of a laser for generating a laser light beam and an improved optical array for splitting, directing, and recombining the laser light beam. The improved optical array includes beam splitting means and a pair of optical reflecting means arranged to provide variable and fixed light beam path legs. The variable leg of the interferometer light beam path has a gravity measuring portion and an external motion compensating portion arranged in a vertical alignment with respect to each other and extending from opposite upper and lower sides of the beam splitting means. The reflecting means are preferably cornercube retroreflectors disposed in the respective gravity measuring and external motion compensating portions of the variable beam path leg and thus in vertical alignment with one another in spaced relation from opposite sides of the beam splitting means. The retroreflectors face toward one another and terminate the light beam path in the respective gravity testing and motion compensating variable leg portions. Such vertical alignment of the cornercube retroreflectors in the respective upper gravity testing and lower motion compensating portions of the variable beam path leg of the improved interferometer arrangement substantially eliminates systematic errors from tilt-induced path length changes which existed in the prior art JILA measuring apparatus.

The test mass tracking system of the inline measuring apparatus employs an evacuated housing, a cart containing a test mass incorporating the upper retroreflector disposed in the upper gravity testing portion of the variable leg of the interferometer light path and having a drag-free enclosure surrounding the test mass on the cart, and guide means supporting the cart for vertical movement along a vertical path within the housing. The test mass tracking system further includes a rotary drive source and a motion transmitting train coupled to the drive source and cart for vertically moving the cart along the guide means, a servo mechanism for sensing cart movement relative to the test mass, a rotary shaft encoder for monitoring the position of the cart within the test mass chamber by reading the rotation of the rotary drive source, and an improved cart controller capable of selecting either one of a drop mode or a throw mode of operation for the cart during which absolute gravity measurements can be made. The capability of selecting operation of the cart in either one or the other of the two test mass tracking modes—drop or throw—permits greater versatility of the apparatus.

The superspring mechanism of the inline measuring apparatus includes an inertial mass incorporating the lower cornercube retroreflector disposed in the lower external motion compensating portion of the interferometer light beam path variable leg. The superspring mechanism also includes motion compensation means employing spring means operable for maintaining the inertial mass and the lower retroreflector therewith in a motionless state to provide isolation of the inertial mass from external or ground motion. The improvement incorporated by the superspring mechanism is a temperature-responsive adjustable lever mechanism coupled with the spring means and operable to provide compensation for temperature-induced variations in spring length for cancelling out long-term drifts and reducing the overall length of the apparatus.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

General

Figure 1A:
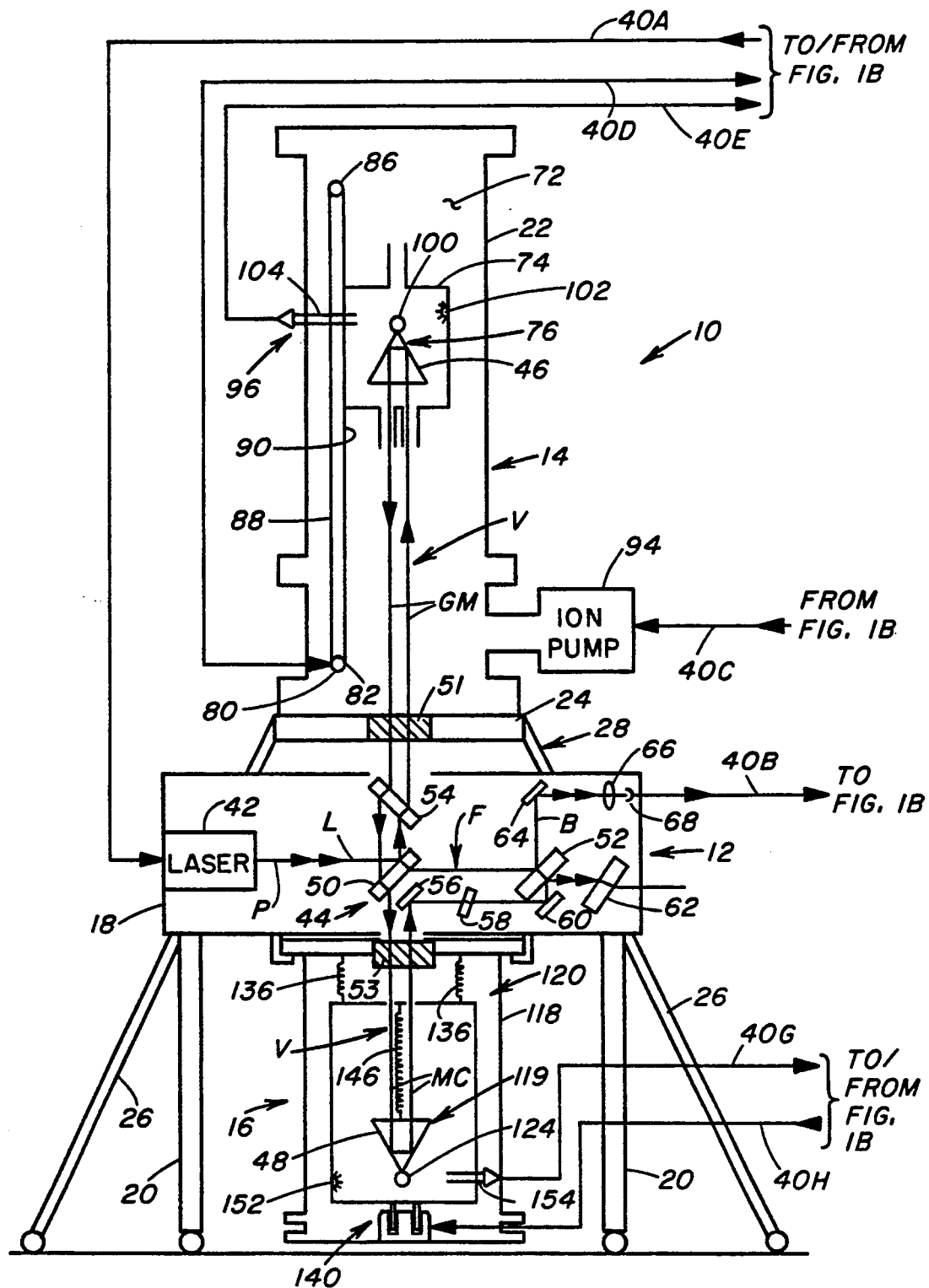
FIGS. 1A and 1B together constitute a diagrammatic view of an absolute gravity inline measuring apparatus incorporating the improved operational features of the present invention, namely an improved interferometer arrangement, test mass tracking system, and superspring mechanism.
Figure 1B:
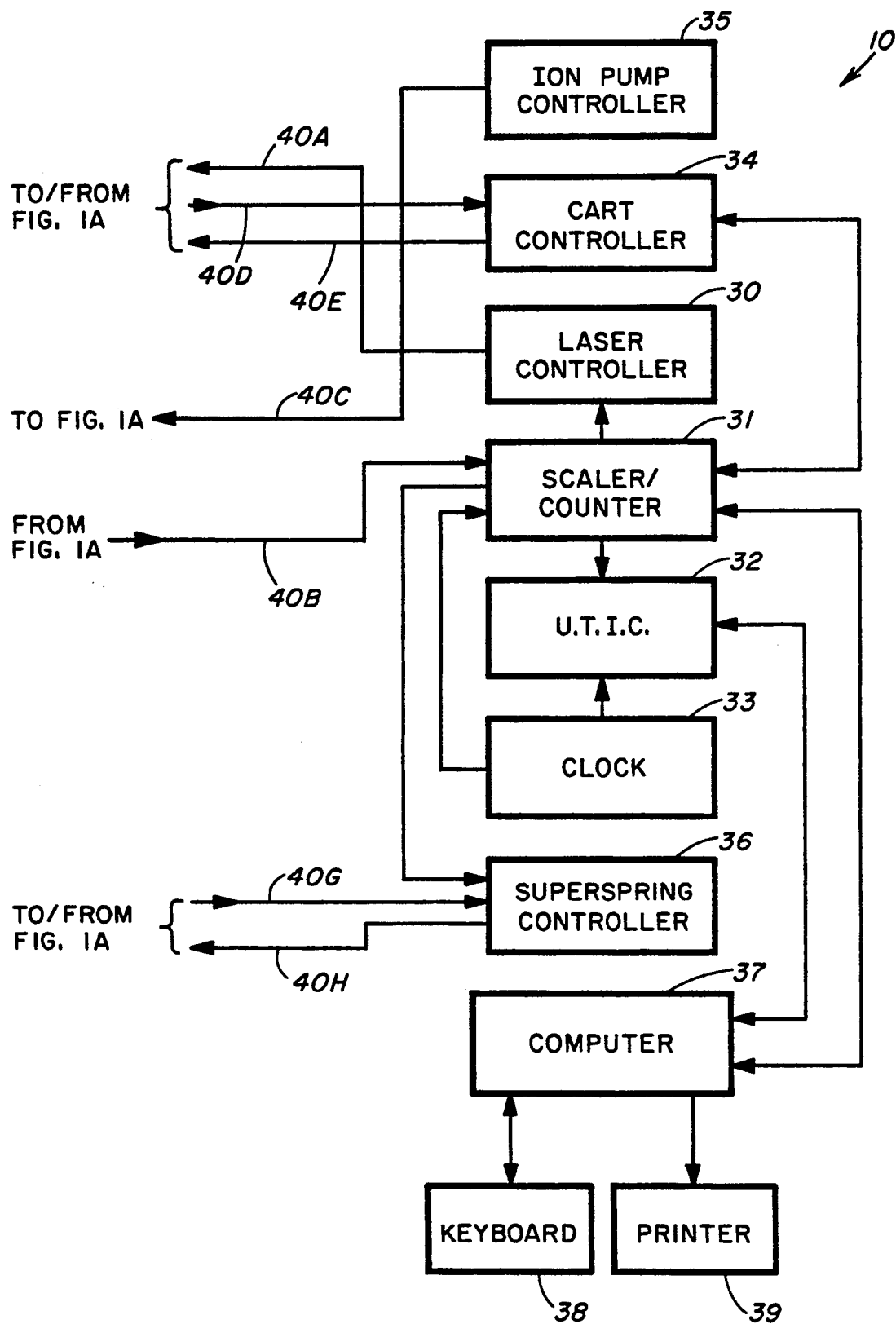
Figure 2:
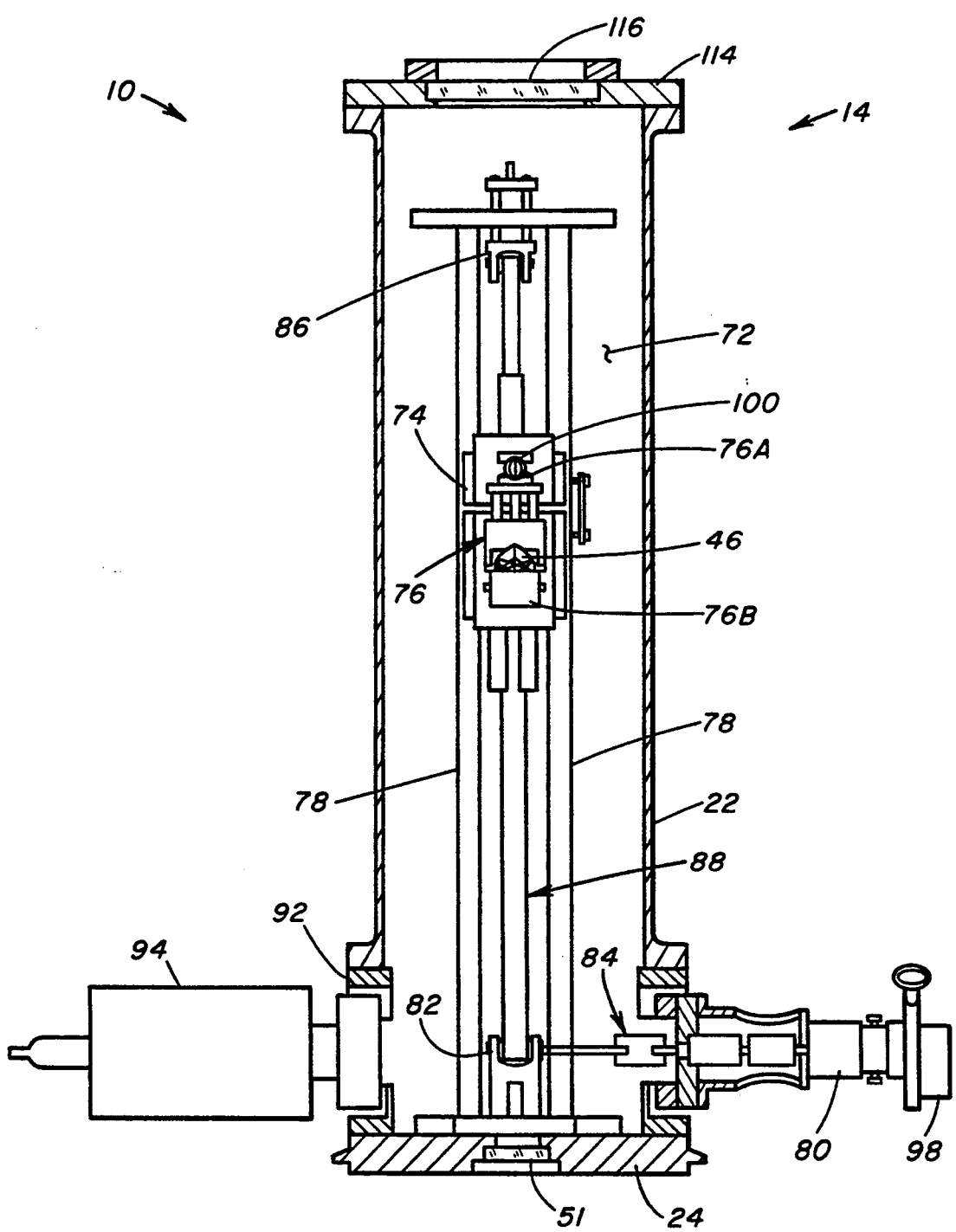
FIG. 2 is an enlarged elevational view, with portions longitudinally sectioned, of the improved test mass tracking system of the inline measuring apparatus.
Figure 3:
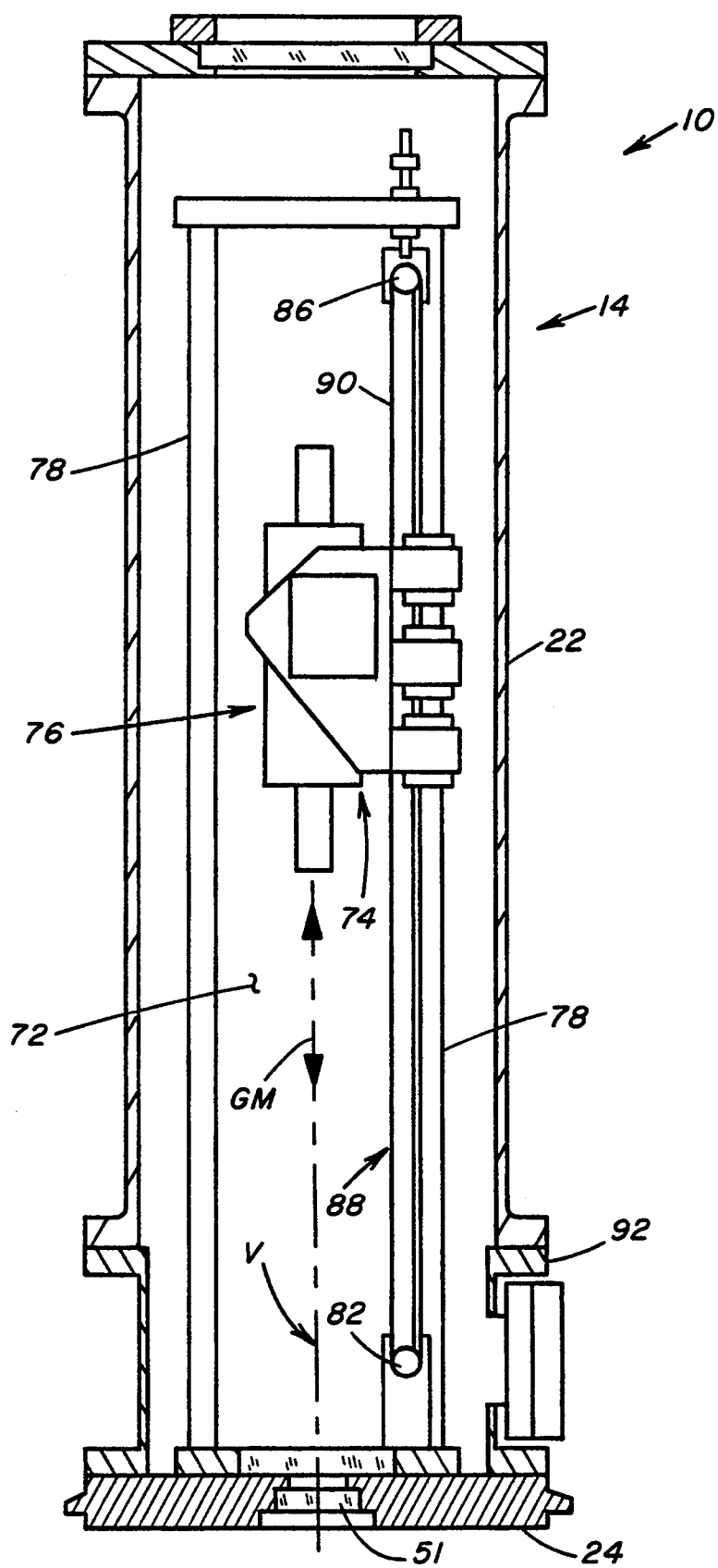
FIG. 3 is another elevational view, with portions longitudinally sectioned, of a cart and evacuated housing of the improved test mass tracking system of the inline measuring apparatus of FIG. 2.

Referring to the drawings, and particularly to FIGS. 1A and 1B, there is illustrated an absolute gravity inline measuring apparatus 10 of the present invention The inline measuring apparatus 10 incorporates several improved operating features in accordance with the present invention which reduce or eliminate identified sources of systematic errors and thereby provide enhanced high precision and accuracy. Basically, these improved features are incorporated by an interferometer arrangement 12, a test mass tracking system 14, and a superspring mechanism 16 of the inline measuring apparatus 10.

Referring to FIG. 1A, the components of the interferometer arrangement 12 of the inline measuring apparatus 10 define an improved light beam path P having variable and fixed length legs V, F. Further, the variable leg V of the light beam path P includes upper gravity measuring portion GM and a lower external motion compensating portion MC. The upper gravity measuring portion GM and lower external motion compensating portion MC are provided in an inline vertical alignment with one another in accordance with the present invention. Such vertical alignment eliminates systematic errors from tilt-induced path length changes which existed in the prior art JILA measuring apparatus.

Some of the components of the interferometer arrangement 12 which function to generate the light beam L and to split, direct, recombine and output the light beam L are mounted in an enclosure 18 of the apparatus 10 supported by a plurality of spaced-apart vertical legs 20. The remaining components of the interferometer arrangement 12 are incorporated in the test mass tracking system 14 and the superspring mechanism 16 of the apparatus 10.

The test mass tracking system 14 of the inline measuring apparatus 10 is improved in accordance with the present invention so as to be operable in a selected one of multiple modes. The two operational modes employed in making absolute gravity measurements are either one of a test mass tracking "drop" mode or a test mass tracking "throw" mode. The test mass tracking system 14 includes an elongated cylindrical housing 22 and components mounted both externally and internally thereof. The housing 22 is mounted upon a base 24 of the apparatus 10 which is supported by three (only two being shown) inclined leg members 26 of a tripod 28. The tripod leg members 26 are adjustable individually for leveling the base 24 in order to align the cylindrical housing 22 and thereby the upper gravity measuring and lower motion compensating portions GM and MC of the interferometer light beam path variable leg V in a vertical orientation.

The superspring mechanism 16 of the inline measuring apparatus 10 is supported from the bottom of the base 24. The superspring mechanism 16 disposes the lower motion compensating portion MC of the variable leg V of the interferometer light beam path P in a vertical orientation and aligned with upper gravity measuring portion GM thereof. By simulating a long spring, the superspring mechanism 16 functions to reduce the overall length of the apparatus 10 that otherwise would be required to support an inertial mass having the same period (and therewith an optical element which terminates the lower motion compensating portion MC of the interferometer light beam path variable leg V) in a motionless state by providing isolation of the inertial mass and the interferometer light beam B from external, ground motion. The superspring mechanism 16 further is improved in accordance with the present invention to compensate for and cancel out changes in the length of the spring which are induced by variation in ambient temperature and thereby better cancel long-term drifts.

The inline measuring apparatus 10 also includes a plurality of electronic components which are mounted within a pair of sealable containers (not shown). These components, shown in FIG. 1B, include a laser controller 30, scaler/counter 31, a universal time interval counter (UTIC) 32, a clock (rubidium oscillator) 33, a cart controller 34, an ion pump controller 35, a superspring controller 36, a digital computer 37, such as a 386 computer, and a keyboard 38 and printer 39 connected to the computer 37. These components are electrically connected in communication with the interferometer arrangement 12, the test mass tracking system 14 and the superspring mechanism 16 by a plurality of insulated electrical conductor cables 40.

Improved Inline Interferometer Arrangement

Referring to FIG. 1A, there is illustrated the improved interferometer arrangement 12 of the inline measuring apparatus 10. The interferometer arrangement 12 basically includes light beam generating means 42, light beam splitting and recombining means 44 and separate first and second reflecting means 46, 48. The splitting and recombining means 44 initially receives and splits a light beam L into the variable length leg V and the fixed length leg F and later receives and recombines the variable and fixed legs V, F into a recombined light beam B.

The first reflecting means 46 and second reflecting means 48 face toward one another, are disposed on opposite sides of the splitting and recombining means 44, and define therewith an upper gravity measuring portion GM and a lower external motion compensating portion MC of the variable leg V of the interferometer light beam path P. The upper gravity measuring portion GM and lower motion compensating portion MC of the variable light beam path leg V extend in substantially vertical alignment with one another. The first and second reflecting means 46, 48 are preferably upper and lower cornercube retroreflectors 46, 48. They define the terminal ends of the upper gravity measuring portion GM and lower motion compensating portion MC of the variable light beam path leg V which portions, in turn, are respectively disposed in the test mass tracking system 14 and in the superspring mechanism 16 of the apparatus 10.

Preferably, the light beam generating means 42 is a stabilized Helium Neon laser for generating the light beam L in the form of a laser beam. The laser 42 is connected to the laser controller 30 via the conductor cable 40A. The splitting and recombining means 44 preferably includes a first beam splitter 50 for receiving and then splitting the laser light beam L into the variable and fixed legs V, F, and a second beam splitter 52 for receiving and then recombining the variable and fixed legs V, F into the recombined light beam B. The first beam splitter 50 is disposed between and in vertical alignment with upper and lower cornercube retroreflectors 46, 48. The second beam splitter 52 is disposed in horizontal alignment with the first beam splitter 50 and offset laterally from the vertical alignment between the upper and lower retroreflectors 46, 48 and the first beam splitter 50.

A first split portion of the light beam L is passed through the first beam splitter 50 and transmitted along the fixed leg F of the light beam path P directly to the second beam splitter 52. A second split portion of the light beam L is reflected precisely vertically by the first beam splitter 50 along the gravity measuring portion GM of the variable leg V of the light beam path P. The second split beam portion thus travels through a transparent window 51 in the housing 22 of the test mass tracking system 14 to the upper retroreflector 46 of the interferometer arrangement 12 located in the housing 22 of the tracking system 14. The second split beam portion is then reflected by the upper retroreflector 46 and returned back through the window 51 from the housing 22 toward the first beam splitter 50. The test mass tracking system 14 functions to track the upper retroreflector 46 during performance of gravity measurements which result from a change in the length of the path travelled by the second split beam portion through the gravity measuring portion GM of the variable leg V of the interferometer arrangement 12.

Before the second split beam portion returning from the upper retroreflector 46 reaches the first beam splitter 50, it is intercepted by a light-transmissive compensating plate 54 of the interferometer arrangement 12 disposed between the first beam splitter 50 and upper retroreflector 46. Upon passing the second split beam portion, the compensating plate 54 causes its path to offset in one direction by the same distance that its path will become offset in an opposite direction when the second split beam portion passes through the first beam splitter 50. In such manner, the gravity measuring portion GM and motion compensating portion MC of the variable leg V of the light beam path P being travelled by the second split beam portion will remain in vertical alignment with one another.

The returned second split beam portion passes through the first beam splitter 50, then through a transparent window 53 in the bottom of the enclosure 18, to the lower retroreflector 48 of the interferometer arrangement 12 located in the superspring mechanism 16. The second split beam portion is then reflected by the lower retroreflector 48 and returned back through the window 53 from the superspring mechanism 16 toward the first beam splitter 50. The superspring mechanism 16 functions to prevent movement with respect to inertial space of the lower retroreflector 48 during performance of gravity measurements to prevent a change in the length of the path travelled by the second split beam portion through the motion compensating portion MC of the variable leg V of the interferometer arrangement 12 due to the micro-seismic motions of the earth's surface transmitted to the interferometer enclosure 18 from which the superspring mechanism 16 is suspended.

The second split beam portion returned from the lower retroreflector 48 in the motion compensating portion MC of the variable light path leg V does not reach the first beam splitter 50 but instead is intercepted by a first mirror 56 of an array of optical elements disposed along the light beam path between the second beam splitter 52 and the lower retroreflector 48 for directing the light beam to the second beam splitter 52. Other elements of the array optical elements include a light-transmissive translating plate 58 and beam angle adjustment mirror 60 for use in accurately adjusting and directing the path of the test beam portion F from the lower retroreflector 48 to the second beam splitter 52.

The second beam splitter 52 receives and recombines the second split beam portion of the variable leg V and the first split beam portion of the fixed leg F so as to produce interference fringes. Two separate recombined beams are produced at this point. One recombined beam passes through an attenuator plate 62 and out through a port in the side of the interferometer enclosure 18. This beam can be steered to either a collimating telescope (not shown) or to a translation detector (not shown) which are used only during setup of the apparatus 10. The other recombined beam B is reflected by a mirror 64, passed through a neutral density filter 66 and focused by a lens onto an avalanche photodiode (APD) 68 where the interference fringes are converted to continuous wave signals, and transmitted to the scaler/counter 31 via the conductor cable 40B. A comparator in the scaler/counter 31 detects the zero-crossings of the sinusoidal fringes and outputs TTL pulses corresponding to the frequency-swept fringe signal which, in turn, corresponds to the free flight of a test mass which incorporates the upper retroreflector 46. Also at the scaler/counter 31, the fringes are scaled (divided, typically by 4000) and then timed with the UTIC 34. The digital computer 37 reads the data from the scaler/counter 31 and uses them to calculate absolute gravity value for each drop or throw and store the calculated value on disk.

Improved Test Mass Tracking System

Referring to FIGS. 1A, 1B and 2–5, there is shown the test mass tracking system 14 of the inline measuring apparatus 10. The test mass tracking system 14 includes the elongated can or housing 22 mounted upon tripod base 24 and defining a chamber 72 therein, an elevator-type cart 74 containing a test mass 76 in a drag-free enclosed portion of the cart which also incorporates the upper cornercube retroreflector 46 of the gravity measuring portion of the interferometer variable leg V, and guide means in the form of a pair of vertical guide rails 78 mounted upright within the chamber 72 of the housing 22 upon the tripod base 24. The guide rails 78 support the cart 74 for vertical movement along a vertical path defined by the guide rails 78.

The test mass tracking system 14 also includes a rotary drive source in the form of DC servo drive motor 80 mounted on the exterior of the lower portion of the housing 22 and a motion transmitting train in the form of a bottom pulley assembly 82 drivingly coupled by a rotary shaft 84 to the servo motor 80 and a top pulley assembly 86 drivingly coupled to the bottom pulley assembly 82 by an endless stainless steel belt 88. The cart 74 is attached to one span 90 of the belt 88 such that selective operation of the servo drive motor 80 in either clockwise or counterclockwise rotary driving directions will cause transmission of corresponding rotary motion to the bottom pulley assembly 82 so as to drive the one span 90 of the belt 88 and the cart 74 therewith either upwardly or downwardly along the vertical path defined by the guide rails 78.

The effects of air resistance on the test mass 76 is substantially eliminated by creating a vacuum inside of the chamber 72 and providing a drag-free enclosure surrounding the test mass 76 on the cart 74. A stainless steel service ring 92 disposed at the lower end of the housing 22 provides connection and communication for an ion pump 94 mounted at the exterior of the housing 22 which is operated by the ion pump controller 35 via conductor cable 40C to maintain the chamber 72 in an evacuated condition. The service ring 92 also mounts the servo drive motor 80 and coupler shaft 84 and other feedthrough connections through which some of the electrical conductor cables 40 pass into the housing 22.

The tracking system 14 further includes a servo mechanism 96 for sensing the position of the cart 74 relative to the test mass 76, and a rotary shaft encoder 98 for monitoring the position of the cart 74 via the servo drive motor 80. The servo mechanism 96 includes an optical glass sphere 100 mounted on the test mass 76, and a diode (LED) 102 and a position-sensitive photodetector 104 both carried by the cart 76 adjacent to the opposite sides of the glass sphere 100. The cart controller 34 is connected via conductor cable 40D to the servo drive motor 80 and encoder 98 and via conductor cable 40E to the linear photodetector 104.

The test mass 76 initially rests on a mount 105 of hard non-magnetic material formed on a transverse throw plate 106 in the cart 74. The test mass 76 has a plurality of intermediate rods 107 interconnecting upper and lower portions 76A and 76B of the test mass 76 and extending through a plurality of holes 108 in the throw plate 106. The test mass 76 is vertically movable relative to the throw plate 106 with the lower portion 76B of the test mass 76 disposed below the throw plate 106 being heavier than the upper portion 76A of the test mass 76 located above the throw plate 106. Thus, the center of gravity of the test mass 76 is located below the throw plate 106 which is on the opposite side thereof from the side from which the test mass 76 is dropped or thrown by the throw plate 106. This relationship tends to maintain the lateral stability of the test mass 76 while it is being carried. The upper cornercube retroreflector 46 which terminates the upper gravity measuring portion GM of the interferometer variable leg V is mounted on the lower portion 76B of the test mass 76, while the optical glass sphere 100 of the servo mechanism 96 is mounted on the upper portion 76A of the test mass 76.

The servo mechanism 96 functions to monitor the position of the test mass 76 in free flight relative to the cart 74 by focussing light from the LED 102 carried on the cart 74, through the glass sphere 100 attached to the falling test mass 76, onto the linear photodetector 104 also carried on the cart 74. A feedback signal is thus generated by the photodetector 104 of the servo mechanism 96 to the cart controller 34 via the conductor cable 40E which is used to control the operation of the drive motor 80 to either change or maintain the position of the cart 74 relative to the test mass 76.

Figure 4:
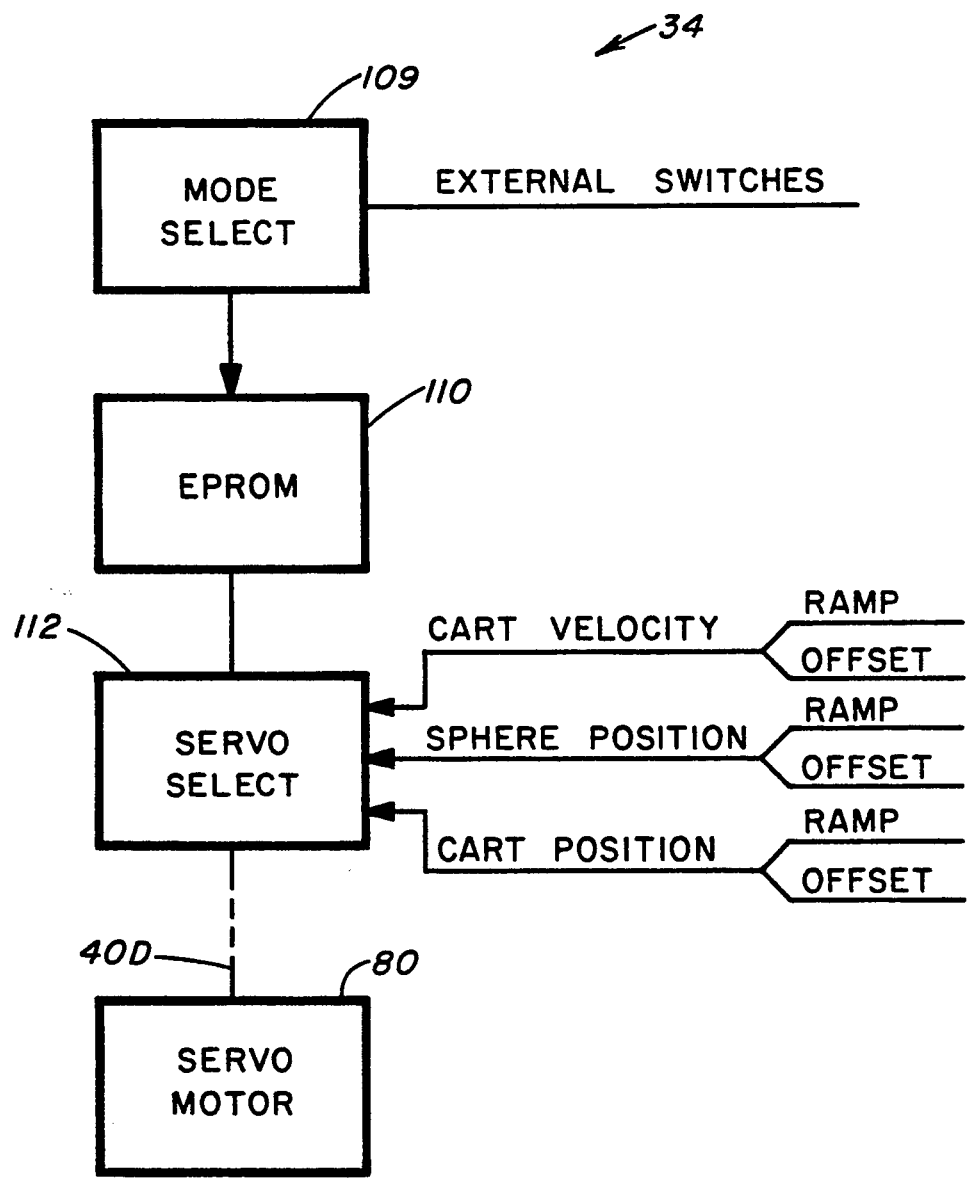
FIG. 4 is a diagram of the basic components of a cart controller of the inline measuring apparatus.

Referring to FIG. 4, there is illustrated the basic electronic components of the cart controller 34 which are employed to selectively operate the cart 74 of the test mass tracking system 12 in either one of a drop mode or a throw mode during which absolute gravity measurements can be made. The components include a mode select 109, an programmable read-only memory (EPROM) 110 and a servo select 112. The mode select 109 is actuated by external switches (not shown) for selecting either one of the two operational modes for absolute gravity measurement—drop or throw—as well as one of three other modes—manual, oscillate or standby which are selected for other purposes. The EPROM 110 stores different sequences for each mode selected. The servo select 112 choses the appropriate tracking parameters for the cart 74. The servo drive motor 80 is connected to the servo select 112 via the conductor cable 40D.

Figure 5:
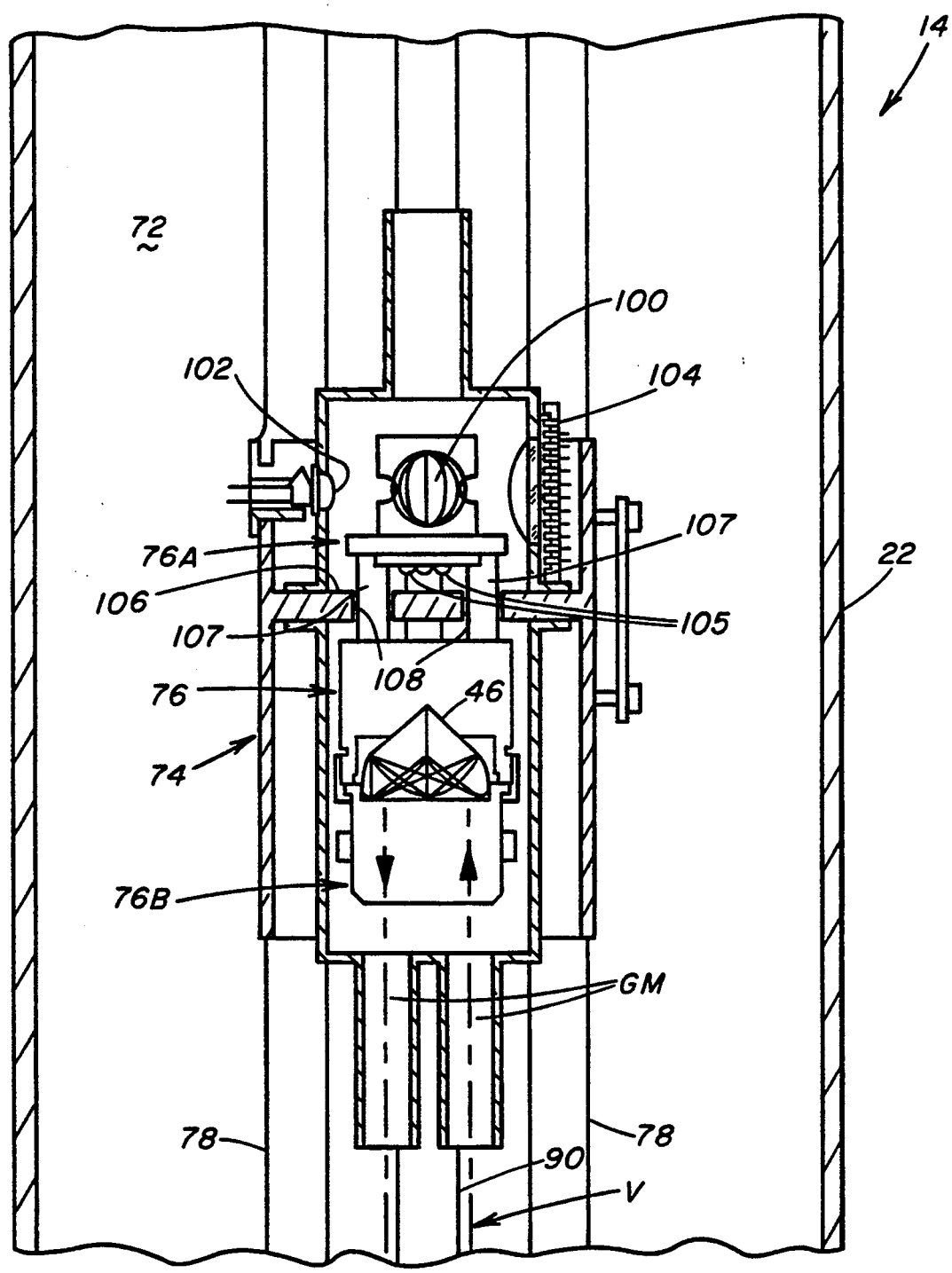
FIG. 5 is an enlarged fragmentary elevational view, with portions longitudinally sectioned, of the improved test mass tracking system of FIG. 3, showing the test mass in flight and the cart in tracking relation to the test mass during a drop measurement mode of the apparatus.

FIG. 5 diagrammatically shows the test mass 76 in flight and the cart 74 in tracking relation to the test mass 76 during either one of the throw mode or drop mode of operation of the inline measuring apparatus 10. In the throw mode, at a command given by the cart controller 34 to the servo drive motor 80 via the conductor cable 40D, the cart 74 accelerates from a rest position to a fixed constant velocity, and then "throws" the test mass 76 into free flight from the throw plate 106. The test mass 76 is thrown vertically, reaching the apex of its trajectory at about fifteen centimeters from the throw point, and then falling the same distance. During this period valid data is acquired by the tracking system 12. The cart 74 tracks the test mass 76, maintaining a constant separation throughout its trajectory. When the test mass 76 and cart 74 pass the catch point on the way downward, the cart controller 34 slows servo drive motor 80 and thereby the cart 74 until it gently catches the test mass 76 and comes to a halt, completing the throw cycle of the throw mode of operation.

The tracking system 14 can also be set to operate in the drop mode. The cart 74 and test mass 76 begin the cycle from a resting position at a high point near the top pulley assembly 86. At the receipt of an appropriate signal from the cart controller 34 by the servo drive motor 80 via the conductor cable 40D, the cart 74 is accelerated downward to a fixed, constant velocity, and then tracks the free-falling test mass 76 through the catch point. Upon passing through the catch point, the cart 74 catches the test mass 76, and then returns it to the start position. At a top flange 114 of the elongated housing 22, there is a viewing port 116 that allows observation of the cart 74 and test mass 76. A cover (not shown) for the port 116 excludes ambient light during the taking of the actual measurement.

Improved Superspring Mechanism

Referring now to FIGS. 1A, 1B and 6–8, there is illustrated the improved superspring mechanism 16 of the inline measuring apparatus 10. The superspring mechanism 16 is a long-period, active, vertical isolator used to compensate for possible non-gravity induced vertical motions of the first beam splitter 50. The superspring mechanism 16 includes a support container 118 attached to and extending below the bottom of the interferometer enclosure 18, an inertial mass 119, a motion compensating means 120 being operable to maintain the inertial mass 119 in a motionless state, and a temperature-responsive lever mechanism 122 being operable to compensate for temperature-induced changes in the motion compensating means 120. The inertial mass 119 incorporates the lower cornercube retroreflector 48 of the lower motion compensating portion MC of the interferometer variable path leg V and an optical glass sphere 124 of a servo mechanism 126. The servo mechanism 126 is provided to detect motions of the superspring mechanism 16, such as causes by seismic disturbances, which would otherwise change the path length of the second split beam portion in the interferometer variable leg V and to generate an electrical output which is communicated to the superspring controller 36 via the conductor cable 40G for activating the motion compensating means 120 to cancel out these motions.

The motion compensating means 120 includes a fine motion compensating means 128 and a coarse motion compensating means 130. The fine motion compensating means 128 includes an upper platform 132 supported above a bottom flange 118A of the container 118 by a plurality of support rods 134, a plurality of elongated auxiliary springs 136 supported by respective adjustable connectors from the platform 132, and a lower platform 138 supported from the lower ends of the auxiliary springs 136. Preferably, there are three of the auxiliary springs 136 angularly displaced from one another by approximately 120°. The fine motion compensating means 128 also includes an electromagnetic coil-type linear actuator 140 mounted between the lower platform 138 and the bottom flange 118A of the support container 118. The linear superspring actuator 140 also is connected to the controller 36 via the conductor cable 40H.

The coarse motion compensating means 130 includes an elongated hollow tube 142 mounted upright on the lower platform 138 by an annular support structure 144 and an elongated main spring 146 which supports at its lower end the inertial mass 119 incorporating the lower cornercube retroreflector 48 of the lower motion compensating portion MC of the interferometer variable path leg V and the optical glass sphere 124 of the servo mechanism 126. The inertial mass 119 is disposed within a central cavity 144A defined by the annular support structure 144 at the lower end of the tube 142 and is vertically movable relative thereto within the cavity 144A.

Figure 6:
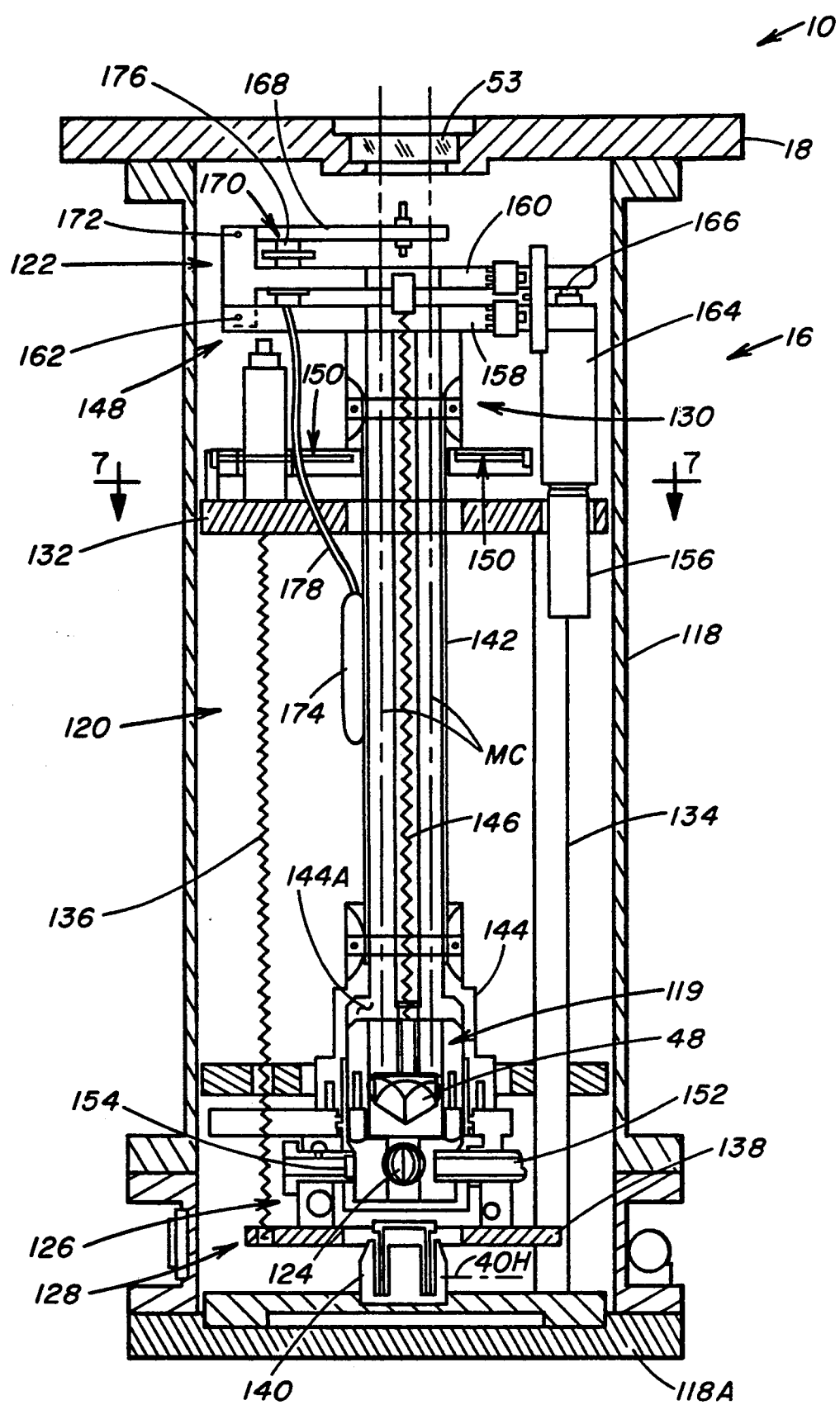
FIG. 6 is a side elevational view, with portions longitudinally sectioned, of the improved superspring mechanism of the inline measuring apparatus.
Figure 7:
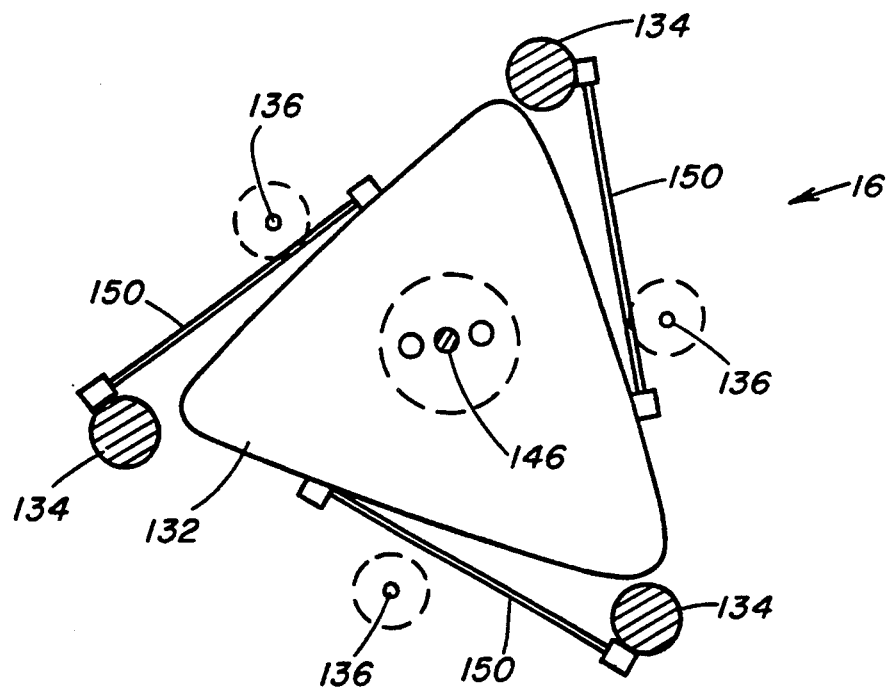
FIG. 7 is an enlarged diagrammatic cross-sectional view taken along line 7—7 of FIG. 6.

As best seen in FIG. 6, the coarse motion compensating means 130 also includes a servo-adjustable lever mechanism 148 mounted on the upper end of the upright tube 142, and a flexure assembly 150 constraining the upright tube 142 relative to the upper platform 132 for movement only vertically and linearly relative to the upper platform 132 and the support container 118. The flexure assembly 150 includes a plurality of pairs of flexure members, such as six in number, arranged in two triangular arrays.

In addition to the optical glass sphere 124, the servo mechanism 126 includes a light-emitting diode (LED) 152 mounted on the support structure 144 at one side of the glass sphere 124 and a split phase photodetector 154 mounted on the support structure 144 at an opposite side of the glass sphere 124. Any relative movement between the inertial mass 119 and the support structure 144 is detected by the change in the distribution of light received by the photodetector 154 from the LED 152 through the glass sphere 124. The photodetector 154 generates an electrical output signal representative of the relative movement which is transmitted to the superspring controller 36 via the conductor cable 40G.

The output signal generated by the photodetector 154 is employed by the superspring controller 36 to actuate the linear actuator 140 to cause movement of the lower platform 138 upwardly or downwardly as needed to change the effective lengths of the auxiliary springs 136 and thereby cancel the vertical ground motion causing the relative movement between the inertial mass 119 on the main spring 146 and the support structure 144 on the lower platform 138. Such movement of the lower platform 138 by the linear actuator 140 provides a fine adjustment in the length of auxiliary springs 136.

The output signal generated by the photodetector 154 is also employed to actuate a drive motor 156 of the servo-adjustable lever mechanism 148 best seen in FIG. 6. The servo-adjustable lever mechanism 148 mounted on the upper end of the upright tube 142 above the flexure assembly 150 includes a lower base member 158 attached on the tube 142 for movement therewith and an upper lever member 160 pivotally mounted at one end at point 162 to one end of the lower member 158. The drive motor 156 is attached on the opposite end of the lower member 158 and is coupled to an actuator 164 having a movable shaft 166. The movable shaft 166 contacts the opposite end of the upper lever member 160 and is extendable and retractable along a vertical axis upon actuation of the motor 156 to cause pivoting of the upper lever member 160 relative to the lower member 158. The temperature-responsive lever mechanism 122 described below couples the upper end of the main spring 146 to the one end of the upper lever member 160 of the servo-adjustable lever mechanism 148 such that at any given position of the temperature-responsive lever mechanism 122 relative to the upper lever member 160 the pivoting of the upper lever member 160 will change the effective length of the main spring 146. Such pivotal movement of the upper lever arm 160 provides a rough or coarse adjustment in the length of the main spring 146.

As mentioned above, the temperature-responsive lever mechanism 122 is the improvement incorporated by the superspring mechanism 18 in accordance with the present invention. The temperature-responsive lever mechanism 122 includes a lever arm 168 and a temperature-responsive actuator assembly 170. The lever arm 168 is mounted at one end about pivot point 172 to the one end of the upper lever member 160 of the servo-adjustable lever mechanism 148 and coupled at the opposite end to the upper end of the main spring 146 so as to support the main spring 146 and inertial mass 119 respectively extending downwardly through the upright hollow tube 142 and within the cavity 144A of the lower platform support structure 144.

Figure 8:
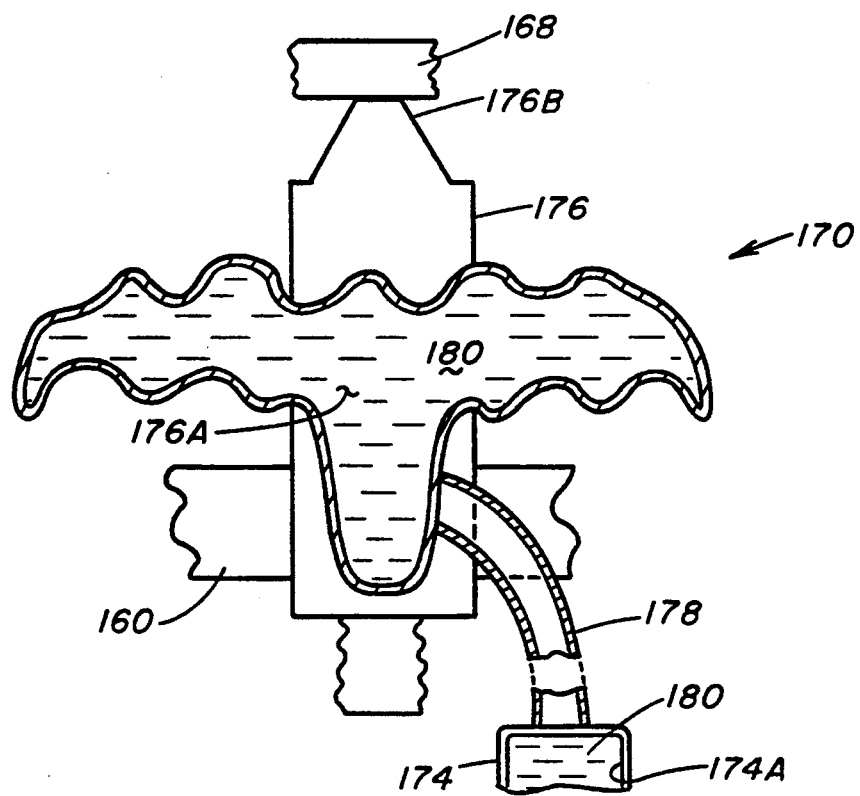
FIG. 8 is an enlarged longitudinal sectional view of an aneroid wafer assembly of a temperature-responsive lever mechanism of the superspring mechanism of FIG. 6.

As best seen in FIG. 8, the temperature-responsive actuator assembly 170 of the lever mechanism 122 preferably is in the form of an aneroid wafer assembly 170 having a substantially non-expandable and non-contractable elongated container body 174 mounted along the exterior of the upright tube 142, an axially expandable and contractable actuating member 176, and an elongated tubular conduit 178 interconnecting in fluid communication an interior cavity 174A of the container body 174 with an interior cavity 176A of the actuating member 176. The interior cavities 174A, 176A contain a predetermined quantity of a hydraulic fluid 180 which will expand and contract in volume in response to increase and decrease in ambient temperature.

The actuating member 176 of the aneroid wafer assembly 170 is attached at a lower end on the upper lever member 160 of the servo-adjustable lever mechanism 126. An upper end 176B of the actuating member 176 engage the lever arm 168 near the one end thereof. An increase or decrease in ambient temperature will cause a proportionate expansion or contraction of the volume of hydraulic fluid. In view that the cavity 174A in the container body 174 is fixed in volume whereas the cavity 176A of the actuating member 176 is variable in volume, the expansion or contraction of the volume of the hydraulic fluid will cause a corresponding axially-directed expansion or contraction of the actuating member 176 and pivoting of the lever arm 168 providing a change of the length of the main spring 146 to compensate for or cancel the temperature-induced change in the length of the main spring 146.

Operation of Absolute Gravity Measuring Apparatus

The inline measuring apparatus 10 is a high precision, high accuracy, portable instrument which can measure the vertical acceleration of gravity "g" using a symmetrical free-fall method. The operation of the apparatus 10 is simple in concept. In the throw mode of operation of the apparatus 10 using the symmetrical free-fall method, the test mass 76 is thrown vertically upwardly by the cart 74 within the drag-free enclosure thereof in the evacuated housing and then allowed to fall, with the cart 74 tracking the test mass 76 during its free flight. In the drop mode of operation of the apparatus 10, the test mass 76 is dropped vertically downward by the cart 74 within the drag-free enclosure thereof and the cart 74 again tracks the test mass during its free flight.

The interferometer arrangement 12 is used to obtain an accurate measurement of the distance travelled by the test mass 76 over time. The interaction of the laser beam L with the moving test mass 76 produces a change in the path length of the variable leg V of the interferometer light beam path P, resulting in the output of interference fringes upon recombining of first and second split portions of the laser light beam from the fixed and variable legs F, V of the interferometer arrangement 12. The interference fringes are counted and timed with an atomic clock to obtain precise time/distance pairs which are numerically reduced to give a value for "g".

Figure 9:
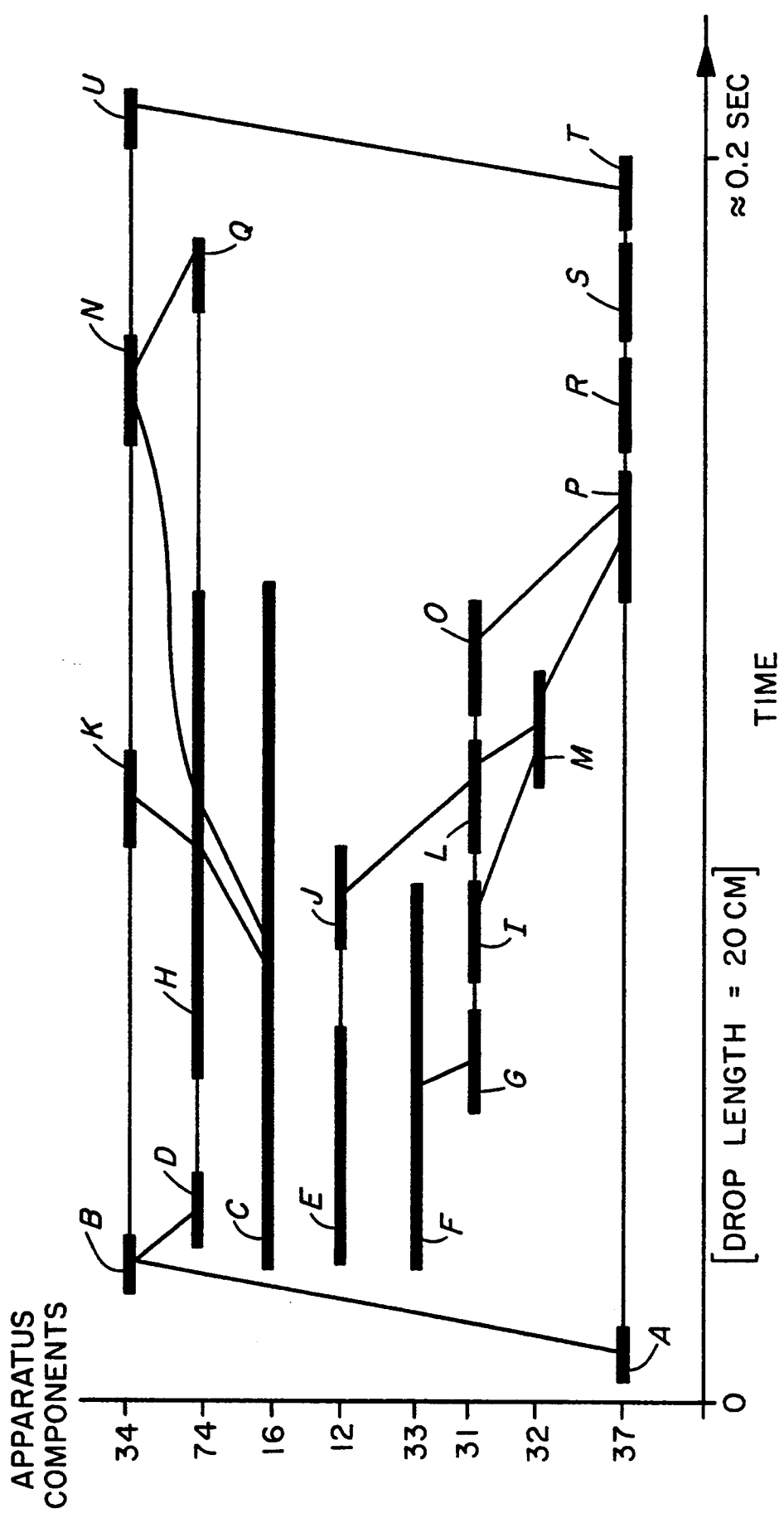
FIG. 9 is a flow diagram of the operational steps performed by the components of the inline measuring apparatus with respect to time.

Referring now to FIG. 9, there is illustrated a flow diagram depicting the operational steps with respect to lapse of time performed in a drop mode of operation by the inline measuring apparatus 10 employing the improved features of the present invention. The steps which are represented by letters A through U in the blocks of the flow diagram of FIG. 9 are explained in Table I as follows:

TABLE I

| Block | Explanation |
| --- | --- |
| A | Computer 37 sends a trigger to cart controller 34 |
| B | Cart controller 34 select drop mode of operation and begins a test mass drop sequence |
| C | Superspring mechanism 16 and superspring controller 36 provide a motionless inertial mass and lower cornercube retroreflector 48 so that retroreflector 48 in motion compensating portion of variable leg V returns the second split beam portion (ongoing) without producing variation of the leg length |
| D | Cart 74 accelerates downward and drops (tracks) test mass 76 |
| E | Second split beam portion from interferometer 12 is sent to upper and lower cornercube retroreflectors 46, 48 on respective test and inertial masses 76, 119 in respective upper gravity measuring and lower motion compensation portions of variable leg of interferometer light path; Optical interference fringes are generated in interferometer 12 by falling test mass 76 and fringes are detected by APD 68 |
| F | Clock 33 sends 10 MHz pulses to scaler/counter 31 (ongoing) |
| G | Scaler/counter 31 scales clock pulses by 2000 |
| H | Optical shaft encoder 98 transmits position and velocity signals to cart controller 34 and test mass free falls while second split beam portion is reflected by integral upper retroreflector 48 (ongoing) |
| I | Scaler/counter 31 sends scaled clock pulses to stop channel of UTIC 32 |
| J | Comparator converts zero crossings from the fringe signal from APD 68 into TTL pulses that are sent to scaler/counter 31 |
| K | Cart controller 34 causes cart 74 to track the test mass 76 during its free flight |
| L | Scaler/counter 31 scales fringes by 4000 and sends them to start channel of UTIC 32 |
| M | UTIC 32 measures the time interval between the last scaled fringe and the next scaled clock pulse |
| N | When cart 74 reaches a predetermined position, cart controller 34 instructs the cart 74 to "catch" the falling test mass 76 |
| O | Scaler/counter 31 sends scaled fringe and clock counts to computer 37 |
| P | Computer 37 reads the time interval from the UTIC 32 and also the number of scaled clock pulses and scaled fringes since the last reading (at a maximum rate of about 1 KHz |
| Q | Cart 74 stops at the bottom of its travel |
| R | Computer 37 calculates time/distance pairs, fits the data to a parabola, and computes the value for gravity |
| S | Computer 37 outputs data files, graphics, statistics, and calculations to storage, screen, printer, etc. |
| T | Computer 37 waits for specified time interval then initiates drop sequence again |
| U | Cart controller 34 begins a drop sequence (ongoing) |

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An absolute gravity inline measuring apparatus, comprising:

(a) an interferometer arrangement defining variable and fixed length legs of a light beam path and including means for generating a light beam, splitting and recombining means for splitting the light beam into first and second split beam portions for travel respectively along said fixed and variable legs and for recombining the first and second split beam portions into a recombined light beam, and upper and lower reflecting means facing toward one another and being disposed on opposite sides of said splitting and recombining means for receiving said second split beam portion and reflecting said second split beam portion toward one another, said upper and lower reflecting means defining with said splitting and recombining means an upper gravity measuring portion and a lower motion compensating portion of said variable leg of said interferometer arrangement extending in opposite directions from said splitting and recombining means and in substantially vertical alignment with one another, said splitting and recombining means including a first beam splitter for receiving and splitting said light beam into first and second split beam portions and a second beam splitter for receiving and recombining said first and second split beam portions into a recombined light beam, said first beam splitter being disposed between and in vertical alignment with said upper and lower reflecting means, said second beam splitter being offset laterally from said first beam splitter and from said vertical alignment between said upper and lower reflecting means and first beam splitter;

(b) a test mass tracking system including a test mass incorporating said upper reflecting means in said upper gravity measuring portion of said variable leg of said interferometer arrangement, said tracking system also including means for selecting one of a plurality of possible predetermined modes of operation for tracking and measuring movement of said test mass to make absolute gravity measurements; and (c) a superspring mechanism including an inertial mass incorporating said lower reflecting means of said lower motion compensating portion of said variable leg of said interferometer arrangement, a motion compensating means incorporating an elongated spring means interconnected to said inertial mass and providing a long period active suspension being operable to maintain said inertial mass in a motionless state, and a temperature-responsive lever mechanism connected to said spring means and being operable to compensate for temperature-induced changes in the length of said spring means.

2. The apparatus of claim 1 wherein said light beam generating means is a laser for generating a laser light beam.

3. The apparatus of claim 1 further comprising:
a compensating means disposed between said first beam splitter and one of said upper and lower reflecting means for offsetting a corresponding one of said first and second split beam portions to compensate for an opposite offsetting of said corresponding one of said first and second split beam portions by said first beam splitter.

4. The apparatus of clam 1 wherein said second beam splitter is also disposed in horizontal alignment with said first beam splitter.

5. The apparatus of claim 4 further comprising:
an array of reflecting means disposed between said second beam splitter and one of said upper and lower reflecting means for directing light from said one of said upper and lower reflecting means to said second beam splitter.

6. The apparatus of claim 1 wherein said upper reflecting means is a cornercube retroreflector.

7. The apparatus of claim 1 wherein said lower reflecting means is a cornercube retroreflector.

8. The apparatus of claim 1 wherein said test mass tracking system also includes:
an elongated housing having an evacuated chamber;
a cart releasably supporting said test mass and vertically movable within said housing;
a drive mechanism operable to cause said cart to move along a vertical path within the housing; and
a cart controller connected to said drive mechanism and including means for selecting either one of a drop mode or a throw mode of operation of said cart for causing either dropping or throwing of said test mass and said upper reflecting means therewith and then tracking and measuring the movement of said test mass along said gravity measuring portion of said variable leg of said interferometer arrangement, without touching said test mass, for making absolute gravity measurements.

9. The apparatus of claim 1 wherein said motion compensating means of said superspring mechanism includes:
coarse motion compensating means incorporating a plurality of elongated auxiliary springs; and
fine motion compensating means incorporating an elongated main spring, said main spring being connected to and supporting said inertial mass;
said temperature-responsive lever mechanism of said superspring mechanism being connected to said main spring and operable to compensate for temperature-induced change in the length of said main spring.

10. An inline interferometer arrangement, comprising:
(a) means for generating a light beam; and
(b) means for defining a variable length leg and a fixed length leg of a light beam path;
(c) said defining means including splitting and recombining means for receiving and splitting the light beam into first and second split beam portions for travel along said fixed and variable legs and for receiving and recombining the first and second split beam portions into a recombined light beam;
(d) said defining means also including separate upper and lower reflecting means facing toward one another and disposed above and below and on opposite upper and lower sides of said splitting and recombining means for receiving said second split beam portion and reflecting said second split beam portion toward one another and toward said splitting and recombining means so as to define therewith upper and lower light path portions of said variable length leg of sad interferometer extending in substantially vertical alignment with one another and in opposite directions from said splitting and recombining means, said splitting and recombining means including a first beam splitter for receiving and splitting said light beam into first and second split beam portions and a second beam splitter for receiving and recombining said first and second split beam portions into a recombined light beam, said first beam splitter being disposed between and in vertical alignment with said upper and lower reflecting means, said second beam splitter being offset laterally from said first beam splitter and from said vertical alignment between said upper and lower reflecting means and first beam splitter.

11. The arrangement of claim 10 wherein said light beam generating means is a laser for generating a laser light beam.

12. The arrangement of claim 10 further comprising:
a compensating means disposed between said first beam splitter and one of said upper and lower reflecting means for offsetting a corresponding one of said first and second split beam portions to compensate for an opposite offsetting of said corresponding one of said first and second split beam portions by said first beam splitter.

13. The arrangement of claim 10 wherein said second beam splitter is also disposed in horizontal alignment with said first beam splitter.

14. The arrangement of claim 10 further comprising:
an array of reflecting means disposed between said second beam splitter and one of sad upper and lower reflecting means for directing light from said one of said upper and lower reflecting means to said second beam splitter.

15. The arrangement of claim 10 wherein said upper reflecting means is a corner cube retroreflector.

16. The arrangement of claim 10 wherein said lower reflecting means is a corner cube retroreflector.

17. A test mass tracking method comprising the steps of:
   (a) providing an absolute gravity measuring apparatus comprising a housing having an evacuated chamber,
      an interferometer with a variable length leg and a fixed length leg, the variable length leg extending vertically in said housing chamber and defining an upper gravity measuring portion and a lower motion compensating portion extending in opposite directions and in substantially vertical alignment with one another.
      a cart disposed in said chamber and movable along said variable leg of said interferometer, and
      a test mass releasably supported by said cart in said chamber and incorporating a reflector for reflecting a light beam along said variable leg of said interferometer.
   (b) selecting in the same absolute gravity measuring apparatus either one of a drop mode or a throw mode of operation of the cart for tracking the test mass and reflector incorporated by the test mass in free fall along said variable length leg of said interferometer;
   (c) moving the cart relative to the test mass in order to release the test mass and thereby either drop or throw the test mass into free flight depending upon whether the drop mode or throw mode was selected;
   (d) maintaining a substantially constant separation between the moving cart and test mass throughout the free flight of the test mass while absolute gravity measurements are being taken; and
   (e) moving the cart relative tot he test mass in order to catch the test mass at completion of taking of the absolute gravity measurements.

18. The tracking method of claim 17 wherein said moving the cart relative to the test mass in order to release the test mass includes accelerating the cart relative to the test mass.

19. The tracking system of claim 17 wherein said moving the cart relative tot he test mass in order to catch the test mass includes decelerating the cart relative to the test mass.

20. A temperature-compensated superspring mechanism, comprising:
   (a) an inertial mass;
   (b) motion compensating means incorporating a support housing and an elongated superspring arrangement being variable in length and supported by said housing and supporting said inertial mass and being operable to maintain said inertial mass in a motionless state in response to motion of said support housing, said superspring arrangement includes an elongated main spring extending vertically and supporting said inertial mass at a lower end of said spring; and
   (c) a temperature-responsive lever mechanism connected to said superspring arrangement and being operable to change the length of said superspring arrangement to compensate for temperature-induced changes in effective length of said superspring arrangement, said temperature-responsive lever mechanism including a lever arm pivotally mounted at one end and supporting an upper end of said main spring at an opposite end of said lever arm and an actuating means having an actuating member engaged with said lever arm and a containing body containing a fixed quantity of hydraulic fluid connected in communication with said actuating member, said actuating member being expandable or contractable in volume in response to increase or decrease in ambient temperature for causing axially-directed expansion or contraction of said actuating member and thereby pivoting of said lever arm to provide a change of the length of said main spring to cancel out a temperature-induced change int he length thereof.

21. The superspring mechanism of claim 20 wherein said motion compensating means also includes:
   fine motion compensating means incorporating a plurality of elongated auxiliary springs of said superspring arrangement; and
   coarse motion compensating means incorporation said elongated main spring of said superspring arrangement with said main spring supporting said inertial mass;
   said temperature-responsive lever mechanism being connected to said main spring and operable to compensate for temperature-induced change in the length of said main spring of said coarse motion compensating means.

22. A temperature-compensated superspring mechanism, comprising:
   (a) an inertial mass;
   (b) motion compensating means incorporating a support housing and an elongated superspring arrangement being variable in length and supported by said housing and supporting said inertial mass and being operable to maintain said inertial mass in a motionless state in response to motion of said support housing, said superspring arrangement includes an elongated main spring extending vertically and supporting sis inertial mass at a lower end of said spring; and
   (c) a temperature-responsive lever mechanism connected to said superspring arrangement and being operable to change the length of said superspring arrangement to compensate for temperature-induced changes in effective length of said superspring arrangement, said temperature-responsive lever mechanism including a lever arm pivotally mounted at one end and supporting an upper end of said main spring at an opposite end of said lever arm and an aneroid wafer assembly having a substantially non-expandable and non-contractable elongated container body, an axially expandable and contractable actuating member engaged with said lever arm to pivot said lever arm in response to expansion and contraction of said actuating member, and an elongated tubular conduit interconnecting in fluid communication an interior cavity of said container body with an interior cavity of said actuating member, said interior cavities containing a predetermined quantity of a hydraulic fluid which will expand and contract in volume in response to increase and decrease in ambient temperature so as to correspondingly expand and contract said actuating member.

* * * * *